United States Patent [19]

Nakayama

[11] Patent Number: 5,150,320
[45] Date of Patent: Sep. 22, 1992

[54] FLOATING-POINT MULTIPLIER DEVICE COMPRISING THREE CARRY PROPAGATE ADDERS OPERABLE IN PARALLEL

[75] Inventor: Takashi Nakayama, Tokyo, Japan

[73] Assignee: NEC Corporation, Tokyo, Japan

[21] Appl. No.: 783,684

[22] Filed: Oct. 29, 1991

[30] Foreign Application Priority Data

Oct. 30, 1990 [JP] Japan .................. 2-292879

[51] Int. Cl.⁵ .............................. G06F 7/38
[52] U.S. Cl. ................................ 364/748
[58] Field of Search ........................ 364/748

[56] References Cited

U.S. PATENT DOCUMENTS

| | | | |
|---|---|---|---|
| 4,649,508 | 3/1987 | Kanuma | 364/748 |
| 4,779,220 | 10/1988 | Nukiyama | 364/748 |
| 4,796,218 | 1/1989 | Tanaka et al. | 364/748 |
| 4,839,846 | 6/1989 | Hirose et al. | 364/748 |
| 4,866,652 | 9/1989 | Chu et al. | 364/748 |
| 4,975,868 | 12/1990 | Freerksen | 364/748 |
| 5,075,882 | 12/1991 | Sakai et al. | 364/748 |

Primary Examiner—Tan V. Mai
Attorney, Agent, or Firm—Whitham & Marhoefer

[57] ABSTRACT

In a floating-point multiplier device for two numbers, each represented by an exponent and a mantissa which includes a binary one integer bit, first and second round-up CPA's (carry propagate adders) (41, 42) are supplied with selected bits of mantissa carries and sums to be operable when a mantissa product is not less than one and is less than two and when the product is not less than two, respectively. As a combination of an ultimate exponent and a rounded-off mantissa of a product of the two numbers, a selector (49) selects one of a first combination of an exponent sum and the mantissa product subjected to round down and to no bit shift, a second combination of the exponent sum and the mantissa product subjected to round down and to a one-bit rightward shift, a third combination of a sum exponent and a first rounded mantissa produced by the first round-up CPA, and a fourth combination of the sum exponent plus one and a second rounded mantissa produced by the second round-up CPA.

9 Claims, 5 Drawing Sheets

FLOATING-POINT MULTIPLIER DEVICE COMPRISING THREE CARRY PROPAGATE ADDERS OPERABLE IN PARALLEL

BACKGROUND OF THE INVENTION

This invention relates to a floating-point multiplier device for use in primarily calculating a product of first and second numbers, each comprising an exponent and a mantissa. More particularly, this invention relates to a floating-point multiplier device which is of the type described and for which each mantissa is a normalized mantissa.

It is known to subject the mantissa of such a product to normalization and round off. In the manner which will become clear as the description proceeds, the normalization is to make every mantissa represent a number which is in a predetermined range. It is specified by the IEEE Standard 754 (IEEE Standard for Binary Floating-point Arithmetic, ANSI/IEEE Std. 754-1985) that the predetermined range is between decimal one, inclusive, and decimal two, exclusive. The round off will presently be described.

The first and the second numbers are represented by binary data signals. The first number comprises a first exponent and a first mantissa. The second number comprises a second exponent and a second mantissa. The binary data signals comprise first and second exponent signals representative of the first and the second exponents and first and second mantissa signals representative of the first and the second mantissas. Inasmuch as the first and the second exponent signals and the first and the second mantissa signals are components of the binary data signals, it is possible to understand that each of the first and the second exponent signals consists of a first predetermined numer e of bits. Each of the first and the second mantissa signals is composed of a second predetermined number n of bits.

In the manner which will later be described more in detail, a conventional floating-point multiplier device comprises an exponent adder supplied with the first and the second exponent signals to produce an exponent sum signal representative of an exponent sum of the first and the second exponents. When each of the first and the second numbers is represented by using the exponent which includes a bias value, the exponent sum is given by a three-term sum of the first and the second exponents plus the bias value.

Supplied with the first and the second mantissa signals, a multiplier array produces a carry save sum signal representative of a carry save sum as a provisional product of the first and the second mantissas. In practice, the carry save sum signal consists of a mantissa carry signal representative of mantissa carries and a mantissa sum signal representative of mantissa sums. In any event, the provisional product is represented by a multiplicity of bits which are equal in number to four times the second predetermined number.

Connected to the multiplier array, a mantissa carry propagate adder uses the provisional product in calculating a mantissa product of the first and the second mantissas and produces a mantissa product signal representative of the mantissa product. More particularly, the carry propagate adder calculates a sum of the mantissa carries and the mantissa sums with carry propagation to provide the mantissa product. The mantissa product signal consists of a plurality of bits which are equal in number to twice the second predetermined number.

According to the above-referencee IEEE Standard 754, each mantissa signal comprises an integer bit representative of binary one. The mantissa product signal therefore comprises either a binary zero bit or a binary one bit at its ten's place, namely, as its most significant bit (MSB). The mantissa product signal is subjected to the normalization in compliance with the most significant bit. Broadly speaking, the mantissa product signal is subjected to a one bit rightward shift, namely, one-bit shifted towards its least significant bit (LSB), when the most significant bit is the binary one bit. When the most significant bit is the binary zero bit, the mantissa product signal is subjected to no bit shift, namely, is used as it stands.

In general, a floating-point multiplier device produces an ultimate product signal which represents an ultimate product of the first and the second numbers and which comprises an ultimate exponent signal representative of an ultimate exponent of the ultimate product by the first predetermined number of bits and a rounded-off mantissa signal representative of a rounded-off mantissa of the ultimate product by the second predetermined number of bits. In order to provide the rounded-off mantissa, the mantissa product of an unlimited precision is subjected to round off. More specifically, the mantissa product signal is subjected to round down and round up by dropping decimal bits to the right of $(n-1)$ decimals with the final remaining bit untouched and with one added to the final remaining bit if a binary zero bit and a binary one bit follows the final remaining bit.

In the conventional floating-point multiplier device, an upper-bit selector is for subjecting upper bits of the mantissa product signal to the normalization by subjecting the upper bits to the one-bit rightward shift and to no bit shift when the most significant bit is the binary one and the binary zero bits, respectively. The upper-bit selector thereby produces a normalised product signal representative of a normalized product.

A round off decoder is connected to the mantissa carry propagate adder through a lower-bit selector to judge from lower bits whether the matissa product signal should be subjected to the round down or to the round up. The round off decoder thereby produces a round down and a round up control signal indicative of the round down and the round up.

An ultimate carry propagate adder is connected to the exponent adder through an exponent selector, to the upper-bit selector, and to the round off decoder. The ultimate carry propagate adder is for concatenating the exponent sum signal and the normalized product signal into a concatention and for subjecting the concatenation to the round down and the round up in compliance with the round down and the round up control signals. The ultimate carry propagate adder thereby produces the ultimate product signal.

It should be noted in connection with the conventional floating-pont multiplier device that carry propagate addition is twice carried out until production of the ultimate product signal, first by the mantissa carry propagate adder and subsequently by the ultimate carry propagate adder. When the first and the second numbers are represented by a double precision floating-point representation which is specified by the IEEE Standard 754, the first and the second predetermined numbers are equal to eleven and fifty-three. Incidentally, the bias value is equal to 1023. It is now understood that the conventional floating-point multiplier device must twice carry out the carry propagate addition in which carries are propagated through a long bit length. The conventional floating-point multiplier device therefore requires a long calculation time.

SUMMARY OF THE INVENTION

It is therefore an object of the present invention to provide a floating-point multiplier device which has an excellently short calculation time.

It is another object of this invention to provide a floating-point multiplier device which is of the type described and which requires only a little increased amount of hardware when compared with a conventional floating-point multiplier device.

It is still another object of this invention to provide a floating-point multiplier device which is of the type described and which comprises three carry propagate adders operable in parallel or simultaneously.

Other objects of this invention will become clear as the description proceeds.

On setting forth the gist of this invention, it is possible to understand that a floating-point multiplier device is supplied with binary data signals which represent a first number comprising a first exponent and a first mantissa and a second number comprising a second exponent and a second mantissa and comprise first and second exponent signals representative of the first and the second exponents and first and second mantissa signals representative of the first and the second mantissas. According to prior art, the above-understood floating-point multiplier device is for calculating an ultimate product of the first and the second numbers, where the ultimate product comprises an ultimate exponent and a rounded-off mantissa and comprises: (a) an exponent adder supplied with the first and the second exponent signals to produce an exponent sum signal representative of an exponent sum of the first and the second exponents: (b) a multiplier array supplied with the first and the second mantissa signals to produce a carry save sum signal representative of a carry save sum as a provisional product of the first and the second mantissas; and (c) a mantissa carry propagate adder connected to the multiplier array to use the carry save sum signal in producing a mantissa product signal representative of a mantissa product of the first and the second mantissas with the provisional product used in calculating the mantissa product.

According to this invention, the above-understood floating-point multiplier device comprises: (A) a first round-up carry propagate adder connected to the exponent adder and the multiplier array to use the exponent sum signal and the carry save sum signal in producing a first sum exponent signal representative of a first sum exponent and a first rounded signal representative of a first rounded mantissa; (B) a second round-up carry propagate adder connected to the exponent adder and the multiplier array to use the exponent sum signal and the carry save sum signal in producing a second sum exponent signal representative of a second sum exponent and a second rounded signal representative of a second rounded mantissa; and (C) selecting means connected to the exponent adder, the mantissa carry propagate adder, and the first and the second round-up carry propagate adders for selecting the ultimate exponent from the exponent sum and the first and the second sum exponents and the rounded-off mantissa from the mantissa product and the first and the second rounded mantissas.

It should be noted in connection with the above-described gist of this invention that the above-recited floating-point multiplier device comprises the mantissa carry propagate adder and the first and the second round-up carry propagate adders as three carry propagate adders. As a result, the above-recited floating-point multiplier device has a somewhat increased amount of hardware when compared with a conventional floating-point multiplier device of the type described before. The above-recited floating-point multiplier device, however, has an astonishingly short calculation time in the manner which will become clear as the description proceeds.

DESCRIPTION OF THE PREFERRED EMBODIMENTS

Figure 1:
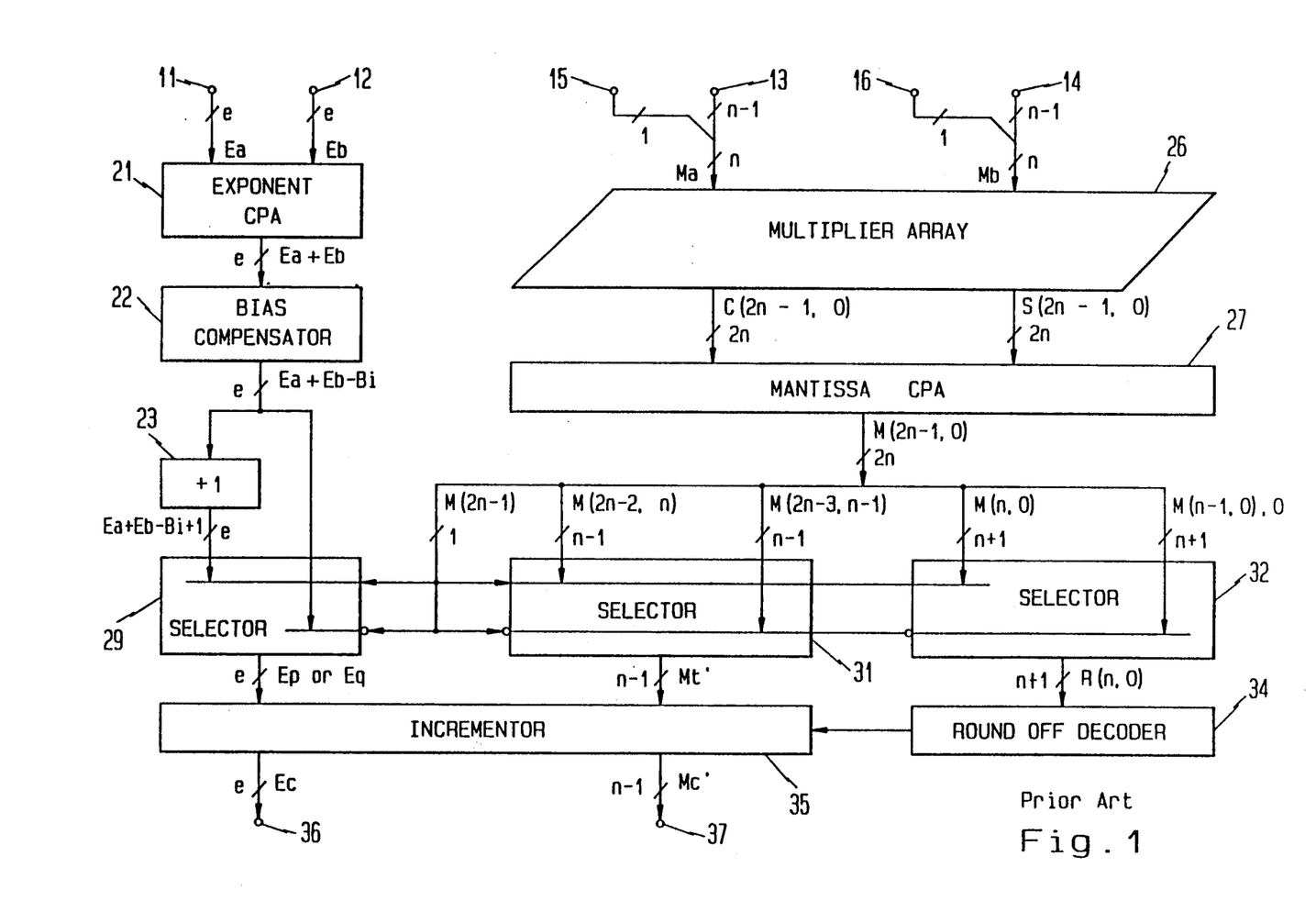
FIG. 1 is a block diagram of a conventional floating-point multiplier device.

Referring to FIG. 1, a conventional floating-point multiplier device will first be described. This is in order to facilitate an understanding of the present invention.

In general, such a floating-point multiplier device is for primarily calculating a product of first and second numbers A and B represented by binary data signals. The first number comprises a first exponent Fa and a first mantissa Ma. The second number comprises a second exponent Eb and a second mantissa Mb. The binary data signal comprise first and second exponent signals Ea and Eb (the same reference symbols being used) representative of the first and the second exponents and first and second mantissa signals Ma and Mb (the same reference symbol being again used) representative of the first and the second mantissas. Inasmuch as the first and the second exponent signals and the first and the second mantissa signals are components of the binary data signals, it is possible to understand that each of the first and the second exponent signals consists of a first predetermined number e of bits. Each of the first and the second mantissa signals consists of a second predetermined number n of bits.

It will be presumed throughout the description made with reference to the drawing figures that each of the first and the second mantissa signals is a normalized mantissa signal, such as the mantissa signal which is used in floating-point calculation specified by the IEEE Standard 754 referred to hereinabove. Inasmuch as the mantissa signal Ma or Mb includes an integer bit which always represents binary one, it is usual to represent each of the first and the second mantissas by an $(n-1)$-bit signal with the integer bit omitted. When an n-th bit representative of the integer bit is removed from the mantissa signal, the first and the second mantissa signals will be called first and second simplified signals and be represented by $Ma'$ and $Mb'$.

According to floating-point representations, the first and the second numbers are represented as follows:

$$A = 2^{(Ea-Bi)} \times Ma, \text{ and}$$

$$B = 2^{(Eb-Bi)} \times Mb,$$

where Bi represents a bias value which is used in general on representing each number by the exponent and the mantissa. When the double precision floating-point representation, described heretobefore, is used, the first and the second predetermined numbers e and n are equal to eleven and fifty-three. The bias value is equal to 1023. It should be noted here in connection with the above that an algebraic sum of each exponent, as called above, and the bias value is herein referred to afresh as an exponent.

In FIG. 1, the floating-point multiplier device has first through sixth device input terminals 11, 12, 13, 14, 15, and 16. The first and the second device input terminals 11 and 12 are supplied with the first and the second exponent signals Ea and Eb. The third and the fourth device input terminals 13 and 14 are supplied with the first and the second simplified signals Ma' and Mb'. Each of the fifth and the sixth device input terminals 15 and 16 is supplied with a single binary one bit, to which the first and the second simplified signals should be concatenated to provide the first and the second mantissa signals Ma and Mb.

An exponent carry propagate adder (exponent CPA) 21 is connected to the first and the second device input terminals 11 and 12 and is supplied through the device input terminals 11 and 12 with the first and the second exponent signals to calculate a provisional sum (Ea+Eb−2Bi) of the first and the second exponents and to produce a provisional sum signal representative of the provisional sum. A bias compensator 22 is connected to the exponent carry propagate adder 21 and is for calculating a compensated sum signal representative of a compensated sum which is equal to the provisional sum plus the bias value.

A simple adder 23 is connected to the bias compensator 22 and adds one to the compenstated sum to produce an adjusted sum signal representative of one plus the compensated sum as an adjusted sum for the purpose which will presently be described. A combination of the exponent carry propagate adder 21, the bias compensator 22, and the simple adder 23 serves as an exponent adder as herein called. Supplied with the first and the second exponent signals, the exponent adder (21-23) produces an exponent sum signal representative of an exponent sum which is either equal to the compensated sum or to the adjusted sum and may be said to be a sum of the first and the second exponents.

A multiplier array 26 is connected to the third through the sixth device input terminals 13 to 16 and comprises a multiple generator, such as one according to Booth, and a plurality of carry save adders (CS$_A$) which are connected as a carry save adder tree to the multiple generator in the manner known in the art. The multiple generator and the carry save adders are therefore not shown. Supplied with the first and the second mantissa signals through the device input terminals 13 through 16, the multiplier array 26 produces a carry save sum signal representative of a carry save sum as a provisional product of the first and the second mantissas. The carry save sum signal consists of a 2n-bit mantissa carry signal C(2n−1, 0) representative of mantissa carries and a 2n-bit mantissa sum signal S(2n−1, 0) representative of mantissa sums. The carry save sum signal therefore consists of a multiplicity of bits which are equal in number to four times the second predetermined number.

A mantissa carry propagate adder 27 is connected to the multiplier array 26 to use the provisional product in calculating a mantissa product (Ma×Mb) of the first and the second mantissas and to produce a mantissa product signal M(2n−1, 0) representative of the mantissa product. More particularly, the mantissa carry propagate adder 27 calculates a sum of the mantissa carries and the mantissa sums with carry propagation to provide the mantissa product. The mantissa product signal is composed of a plurality of bits which are equal in number to twice the second predetermined number.

The bits, 2n in number, of the mantissa product signal will be numbered from a least significant bit (LSB) to a most significant bit (MSB) as zeroth through (2n−1)-th bits. The mantissa product signal is therefore denoted by M(2n−1, 0). as above. The most significant bit of the mantissa product signal is designated by M(2n−1).

Inasmuch as each mantissa signal Ma or Mb always includes a binary one bit as its most signilficant bit, the mantissa product signal includes either a first succession of a binary zero bit and a binary one bit or a second succession of the binary one and the binary zero bits as a succession of the (2n−1)-th and the (2n−2)-th bits, namely, as its most significant bit and the most significant bit but one. The mantissa product signal is subjected to a normalization process to provide a normalized product signal which always includes the binary one bit of the first or the second succession as its most significant bit. More specifically, the mantissa product signal is normalized into a first normalized signal with the most significant bit of binary zero dropped or omitted from the mantissa product signal and with an additional binary zero bit concantenated to the zeroth bit of the mantissa product signal as a zeroth bit of the first normalized signal.

The mantissa product signal is normalized into a second normalized signal by giving a one-bit rightward shift, namely, a one-bit shift towards its least significant bit, to the mantissa product signal to use the binary one bit of the second succession alone as the integer bit of the second normalized signal. This one-bit shift will herein be called "a one-bit normalization shift". In contrast, it will be said that the mantissa product signal is subjected to "no normalization bit shift" when normalized into the first normalized signal.

In general, a floating-point multiplier device produces an ultimate product signal representative of an ultimate product C of the first and the second numbers A and B. The ultimate product signal comprises an ultimate exponent signal representative of an ultimate exponent Ec of the ultimate product and a rounded-off mantissa signal representative of a rounded-off mantissa Mc of the ultimate product by the second predetermined number of bits. In order to provide the rounded-off mantissa, the mantissa product signal is subjected to a round off process of substituting an n-bit nearest value for the mantissa product. If there are an odd and an even nearest value, the even nearast value is used as the rounded-off mantissa.

More in detail, it will first be assumed that a binary zero bit follows the n-th bit of the normalized product signal as the (n−1)-th bit. In this event, the mantissa product signal is subjected to round down to provide a rounded-down mantissa by dropping or omitting fractions to the right of (n−1) decimals with the n-th bit untouched, namely, with the final remaining bit left as it stands. If a binary one bit follows the n-th bit as the (n−1)-th bit, the mantissa product signal is subjected to round up to provide a rounded-up mantissa by dropping the fractions with one added to the n-th bit, namely, by counting the fractions as one at the n-th bit.

The floating-point multiplier device therefore calculates an unlimited-precision product of the first and the second numbers in accordance with a formula:

$$2^{(Ea+Eb-Bi)-Bi} \times (Ma \times Mb). \tag{1}$$

if the mantissa product signal includes the binary zero bit as its most significant bit and is therefore subjected to no normalization bit shift. If the mantissa product signal includes the binary one bit as its most significant bit and is therefore subjected to the one-bit normalization shift, the unlimited-precision product is calculated in compliance with a different formula:

$$2^{(Ea+Eb-Bi+1)-Bi} \times (Ma \times Mb/2). \tag{2}$$

In formula (1), the exponent will be referred to as a compensated exponent and be denoted by Ep. For the compensated exponent Ep, the compensated sum is used. In Formula (2), the exponent will be called an adjusted exponent Eq, for which the adjusted sum is used. Among the rounded-off mantissas, namely, the rounded down and the rounded-up mantissas, the rounded-down mantissa will be denoted by Mt. It should be noted in connection with each of Formulae (1) and (2) that the exponent is a part enclosed with a pair of parenthases.

When the mantissa product signal need not be subjected to the one-bit normalization shift, the mantissa product signal included the first succession as its integer bits. Such a mantissa product signal will be referred to as a first product signal. When the mantissa product signal should be subjected to the one-bit normalization shift, the mantissa product signal includes the second succession as its integer bits. In this event, the mantissa product signal will be called a second product signal.

When the mantissa product signal is the first product signal and furthermore when the round off is the round down, the ultimate product is calculated according to an equation:

$$C = 2^{(Ep-Bi)} \times Mt.$$

In this instance, the ultimate exponent and the rounded-off mantissa are given by equations:

$$Ec = Ep \tag{3}$$

and $$Mo = Mt.$$

When the mantissa product signal is the first product signal and furthermore when the round off is the round up, the mantissa product may or may not be less than decimal two. If the mantissa product is less than two, Formula (1) is applicable. The ultimate exponent and the rounded-off mantissa are therefore calculated in accordance with equations:

$$Ec = Ep \text{ and}$$

$$Mc = Mt + 2^{(n-1)}.$$

If the mantissa product is not less than two, Formula (2) must be used. The ultimate exponent is given by another equation:

$$Ec = Ep + 1. \tag{4}$$

It will now be assumed that the mantissa product signal is the second product signal. When the round off is the round down, the ultimate exponent is given by an equation:

$$Ec = Eq. \tag{5}$$

When the round off is the round up, the mantissa product may or may not be less than two. If the mantissa product is less than two, the ultimate exponent is given in compliance with an equation:

$$Ec = Eq.$$

If the mantissa product is not less than two, the ultimate exponent is given by another equation:

$$Ec = Eq + 1. \tag{6}$$

Summarizing, various parts of the mantissa product signal $M(2n-1, 0)$ will be denoted by signal part expressions in the manner used in the following. In a first instance where the most significant bit $M(2n-1)$ of the mantissa product signal is the binary zero bit, the mantissa product $(Ma \times Mb)$ is not less than decimal one and is less than decimal two. The rounded-down mantissa Mt is given by a first resulting part $M(2n-2, n-1)$ of the mantissa product signal. In the manner which will shortly be described, the first resulting part is produced from a first primary part $M(2n-3, n-1)$ of the mantissa product signal. The ultimate exponent Ec is given by the compensated exponent Ep. A part $(M(n-1,0),0)$ of the first normalized signal is used in judging whether the round off should be the round down or the round up. This part of the first normalized signal may alternatively be called a first secondary part of the mantissa product signal.

In a second instance where the most significant bit $M(2n-1)$ of the mantissa product signal is the binary one bit, the mantissa product $(Ma \times Mb)$ is not less than decimal two and is less than decimal four. The rounded-down mantissa Mt is given by a second resulting part $M(2n-1, n)$ of the mantissa product signal. It will shortly be described that the second resulting part is derived from a second primary part $M(2n-2, n)$ of the mantissa product signal. The ultimate exponent Ec is given by the adjusted exponent Eq. A second secondary part $M(n, 0)$ of the mantissa product signal is used with a one-bit leftward shift in judging whether the round off should be the round down or the round up.

It should be understood in connection with the above that the first primary part is the mantissa product signal which should be normalized into the first normalized signal and from which two integer bits of the binary zero and the binary one bits are dropped. The second primary part is the mantissa product signal which should be normalized into the second normalized signal and from which the most significant bit of the binary one bit alone is omitted. In other words, the first primary part is the first normalized signal from which the integer bit is removed. The second primary part is the second normalized signal from which the integer bit is excluded. Depending on the circumstances, the first and the second primary parts will be called primary and secondary decimal signals.

In FIG. 1, the compensated and the adjusted sums are delivered from the exponent adder (21-23) to an exponent selector 29. From the mantissa product signal M(2n−1, 0), the most significant bit M(2n−1) is selected and supplied to the exponent selector 29 and to first or upper-bit and second or lower-bit mantissa selectors 31 and 32. It should be noted that each of the exponent and the mantissa selectors 29, 31, and 32 comprises first and second parts indicated by two line segments which are horizontally drawn lower and upper in each of the blocks 29, 31, and 32.

The most significant bit is delivered to the first parts of the exponent and the first and the second mantissa selectors 29, 31, and 32 through an inverter which is separately depicted by a small circle adjacent to each of the exponent and the mantissa selectors 29, 31, and 32. The most significant bit is delivered directly to the second parts of the exponent and the first and the second mantissa selectors 29, 31, and 32.

From the mantissa product signal M(2n−1, 0), the first and the second primary parts M(2n−3, n−1) and M(2n−2, n) are selected and supplied to the first mantissa selector 31. The first and the second secondary parts (M(n−1, 0). 0 0) and M(n, 0) are selected and supplied to the second mantissa selector 32.

When the most significant bit M(2n−1) is the binary zero and the binary one bits, the second mantissa selector 32 selects the first and the second secondary parts, respectively, as a round off judge signal R(n, 0). Connected to the second mantissa selector 32, a round off decoder 34 produces a decoded signal by decoding the round off judge signal according to a logic which is listed in Table 1 below.

TABLE 1

| R(n) | R(n − 1) | S | Decoded signal |
|------|----------|---|----------------|
| x    | 0        | 0 | 0              |
| x    | 0        | 1 | 0              |
| 0    | 1        | 0 | 0              |
| 1    | 1        | 0 | 1              |
| x    | 1        | 1 | 1              |

In Table 1, the symbol x indicates whichever of the binary zero and the binary one bits. The symbol S represents an OR of all remaining bits R(n−2, 0) of the round off judge signal. The decoded signal of the binary zero bit may be called a first decoded signal and indicates that the mantissa product signal should be rounded down. The decoded signal of the binary one bit may be called a second decoded signal and indicates that the mantissa product signal should be rounded up.

When the most significant bit is the binary zero and the binary one bits, the exponent selector 29 selects the compensated and the adjusted sums, respectively. The compensated and the adjusted sums are used in this manner when the mantissa product is and is not less than two, respectively.

When the most significant bit is the binary zero and the binary one bits, the first mantissa selector 31 selects the first primary part as a first selected part and the second primary part as a second selected part, respectively. When the most significant bit is the binary zero bit, the first mantissa selector 31 gives a one-bit leftward shift to the first selected part to provide the first resulting part M(2n−2, n−1) as the rounded-down mantissa Mt. When the most significant bit is the binary one bit, the first mantissa selector 31 concatenates the second selected part to a binary one bit to provide the second resulting part M(2n−1, n) again as the rounded-down mantissa Mt. In either event, the first mantissa selector 31 produces an (n−1)-bit modified or simplifed mantissa Mt′ by dropping or omitting the integer bit from the rouned-down mantissa Mt.

An incrementor 35 is connected to the exponent selector 29, the first mantissa selector 31, and the round off decoder 34. The incrementor 35 is a carry propagate adder supplied with the first and the second decoded signals and may alternatively be called an ultimate carry propagate adder. Supplied with the compensated exponent Ep or the adjusted exponent Eq from the exponent selector 29 and with the modified mantissa Mt′ from the first mantissa selector 31, the incrementor 35 concatenates the modified mantissa to the compensated or the adjusted exponent to provide a concatenation.

Inasmuch as the modified mantissa Mt′ is the rounded-down mantissa Mt of a sort, the incrementor 35 leaves the concatenation untouched when supplied with the first decoded signal. In the concatenation, the compensated exponent Ep gives the ultimate exponent Ec according to Equation (3) when the mantissa product and consequently the rounded-down mantissa Mt is less than two. Alternatively, the adjusted exponent Eq gives the ultimate exponent according to Equation (5). When the mantissa product is not less than two even though rounded down, the modified mantissa is preceded by a binary one bit. This binary one bit is carried to the compensated exponent to provide the ultimate exponent in accordance with Equation (4). Alternatively, this binary one bit is carried to the adjusted exponent to provide the ultimate exponent in compliance with Equation (6).

When supplied with the second decoded signal, the incrementor 35 adds one to the least significant bit of the concatenation to change the modified mantissa Mt′ to a rounded-up mantissa. Carries are successively propagated through the concatenation to automatically add one to the compensated exponent Ep or to the adjusted exponent Eq. The ultimate exponent Ec is given in this manner according to Equation (4) or (6).

The incrementor 35 delivers a more significant bits of the concatenation to a first device output terminal 36 as the ultimate exponent Ec. The incrementor 35 delivers (n−1) less significant bits of the concatenation to a second device output terminal 37, as a modified or simplified mantissa Mc′, the rounded-off mantissa Mc from which the integeb bit is removed.

The conventional floating-point multiplier device calculates the ultimate product C of the first and the second numbers A and B with an appreciably long calculation time if the first and the second numbers A and B are given by the double precision representations specified by the IEEE Standard 754. When attention is directed to a critical path, the calculation time in nanoseconds is as follows.

| Multiplier array 26 | 40 |
|---------------------|-----|
| CPA 27 (a 106-bit CPA) | 30 |
| Selector 32 | 5 |
| Round off decoder 34 | 5 |
| Incrementor 35 | 25 |
| Total | 105. |

Figure 2:
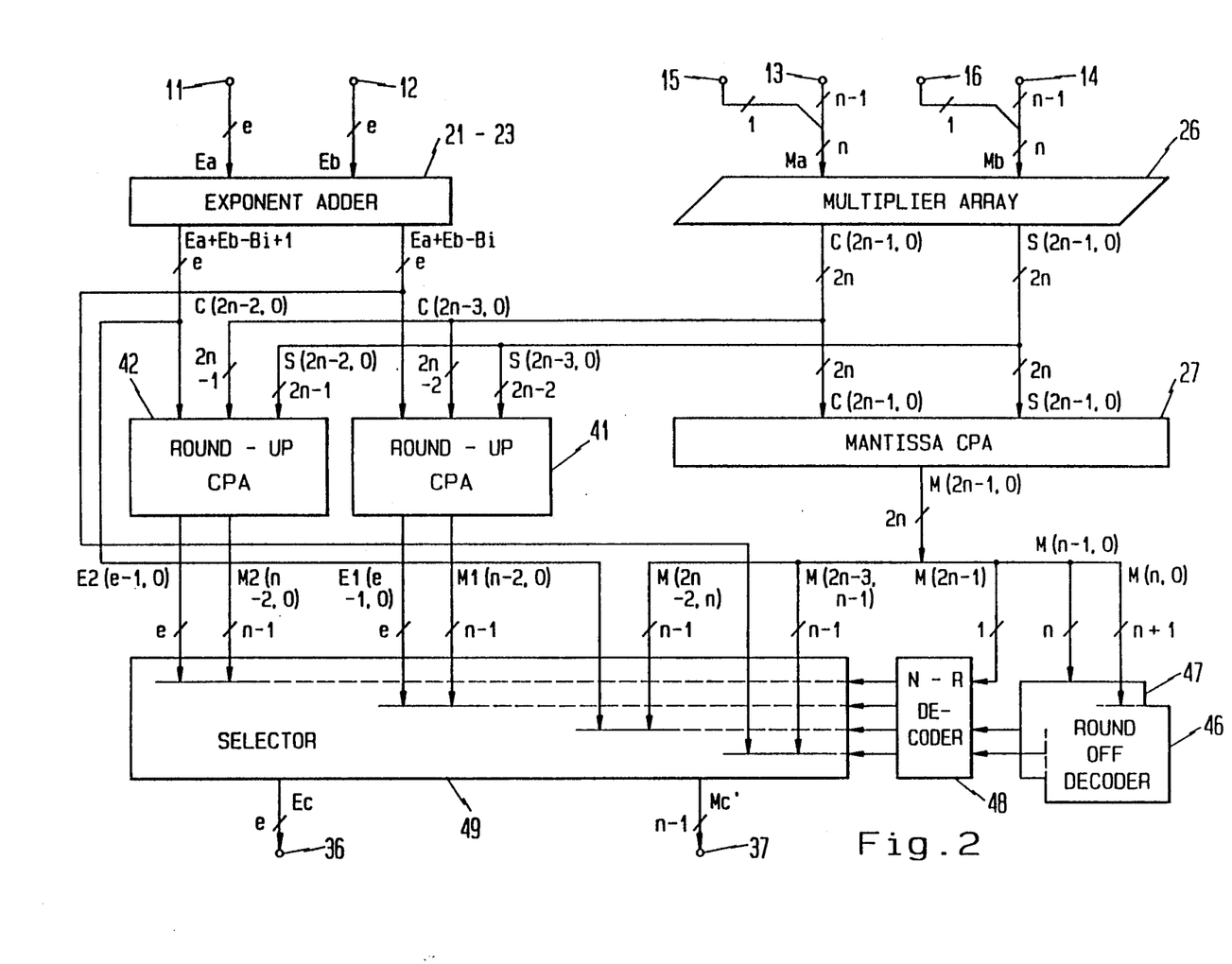
FIG. 2 is a block diagram of a floating-point multiplier device according to a first embodiment of the instant invention.

Referring now to FIG. 2, the description will proceed to a floating-point multiplier device according to a first embodiment of this invention. Similar parts are designated by like reference numerals. Inasmuch as the exponent adder (21–23) is not different from that used in the conventional floating-point multiplier device illustrated with reference to FIG. 1, the exponent carry propagate adder 21, the bias compensator 22, and the simple adder 23 are not individually depicted in FIG. 2. The multiplier array 26 and the mantissa carry propagate adder 27 are not different from those described in conjunction with FIG. 1 but are differently connected in FIG. 2 to other parts of the floating-point multiplier device being illustrated in the manner which will become clear as the description proceeds.

Like the first and the second instances described in connection with FIG. 1, first through fourth cases are taken into account as regards the floating-point multiplier device illustrated with reference to FIG. 2. In connection with the normalization process and the round off process, first and second rounded-down mantissa M1 and M2 are herein defined. The first rounded-down mantissa is used when the mantissa product signal is subjected to no normalization bit shift, namely, when the mantissa product is not less than decimal one and is less than decimal two. The first rounded-down mantissa M1 is defined by dropping the fractions to the right of a decimal bit $2^{-n}$. The second rounded-down mantissa is used when the mantissa product signal is subjected to the one-bit normalization shift, namely, when the mantissa product is not less than two and is less than four. The second rounded-down mantissa M2 is defined by dropping the fractions in the product (Ma×Mb/2) to the right of the decimal bit $2^{-n}$.

The first case is used when the mantissa product is not less than one and is less than two and furthermore when the round off is the round down. Under the circumstances, the ultimate exponent Ec is equal to the compensated exponent Ep. The rounded-off mantissa Mc is equal to the first rounded-down mantissa M1.

That is, $$Ec = Ep \tag{3'}$$

and $$Mc = M1.$$

The second case is used when the mantissa product is not less than one and is less than two and furthermore when the round off is the round up. In this event, the rounded-up mantissa may or may not be less than two. If the rounded-up mantissa is less than two, the ultimate exponent and the rounded-off mantissa are given by equations:

$$Ec = Ep \tag{3''}$$

and $$Mc = M1 + 2^{-(n-1)}. \tag{7}$$

If the rounded-up mantissa is not less than two, the rounded-up mantissa becomes equal to decimal 2.0. The ultimate exponent and the rounded-off mantissa are therefore given by equations:

$$Ec = Ep + 1 \tag{4'}$$

and $$Mc = 1.0.$$

The third case is used when the mantissa product is not less than two and furthermore when the round off is the round down. Under the circumstances, the ultimate exponent and the rounded-off mantissa are given by equations:

$$Ec = Eq \tag{5'}$$

and $$Mc = M2.$$

The fourth case is used when the mantissa product is not less than two and furthermore when the round off is the round up. In this case, the rounded-up mantissa may or may not be less than two. If the rounded-up mantissa is less than two, the ultimate exponent and the rounded-off mantissa are given by equations:

$$Ec = Eq \tag{5''}$$

and $$Mc = M2 + 2^{-(n-1)}. \tag{8}$$

If the rounded-up mantissa is not less than two, the rounded-up mantissa becomes equal to 2.0. The ultimate exponent and the rounded-off mantissa are given by equations:

$$Ec = Eq + 1 \tag{6'}$$

and $$Mc = 1.0.$$

In FIG. 2, a first round-up carry propagate adder 41 is connected to the exponent adder (21–23) to receive the compensated sum signal and to the multiplier array 26 to deal with the second case. A second round-up carry propagate adder 42 is connected to the exponent adder to receive the adjusted sum signal and to the multiplier array 26 to deal with the fourth case. The mantissa carry propagate adder 27 deals with the first and the third cases.

Like the mantissa product signal M(2n−1, 0) described in connection with FIG. 1, each of the mantissa carry and the mantissa sum signals is composed of 2n bits which are numbered from its least significant bit to its most significant bit as zeroth through (2n−1)-th bits. From the mantissa carry signal C(2n−1, 0), a first carry part C(2n−3, 0) is selected and supplied to the first round-up carry propagate adder 41. A second carry part C(2n−2, 0) is selected and supplied to the second round-up carry propagate adder 42. From the mantissa sum signal S(2n−1, 0), a first sum part S(2n−3, 0) is selected and supplied to the first round-up carry propagate adder 41. A second sum part S(2n−2, 0) is selected and supplied to the second round-up carry propagate adder 42.

Inasmuch as the mantissa carry signal and the mantissa sum signal are parts of the carry save sum signal, it is possible to understand the first carry and sum parts collectively as a first carry save sum signal part and the second carry and sum parts collectively as a second carry save sum signal part. It is readily understood that the first carry save sum signal part is obtained from the carry save sum signal by omitting its most significant bit and a next significant bit which immediately follows to the right of the most significant bit under consideration. The second carry save sum signal part is obtained from the carry save sum signal by omitting its most significant bit alone. Depending on the circumstances, the first and the second carry save sum signal parts will be called first and second decimal sum signals.

It will shortly be described that the first round-up carry propagate adder 41 comprises an $(e+2n-3)$-bit carry propagate adder. The second round-up carry propagate adder 42 comprises an $(e+2n-2)$-bit carry propagate adder.

In the manner which will presently be described, the first round-up carry propagate adder 41 processes the compensated sum signal and the first carry save sum signal part into a first sum exponent signal $E1(e-1, 0)$ representative of a first sum exponent and a first rounded signal $M1(n-1, 0)$ representative of a first rounded mantissa. The second round-up carry propagate adder 42 processes the adjusted sum signal and the second carry save sum signal part into a second sum exponent signal $E2(e-1, 0)$ representative of a second sum exponent and a second rounded signal $M2(n-2, 0)$ representative of a second rounded mantissa.

Figure 3:
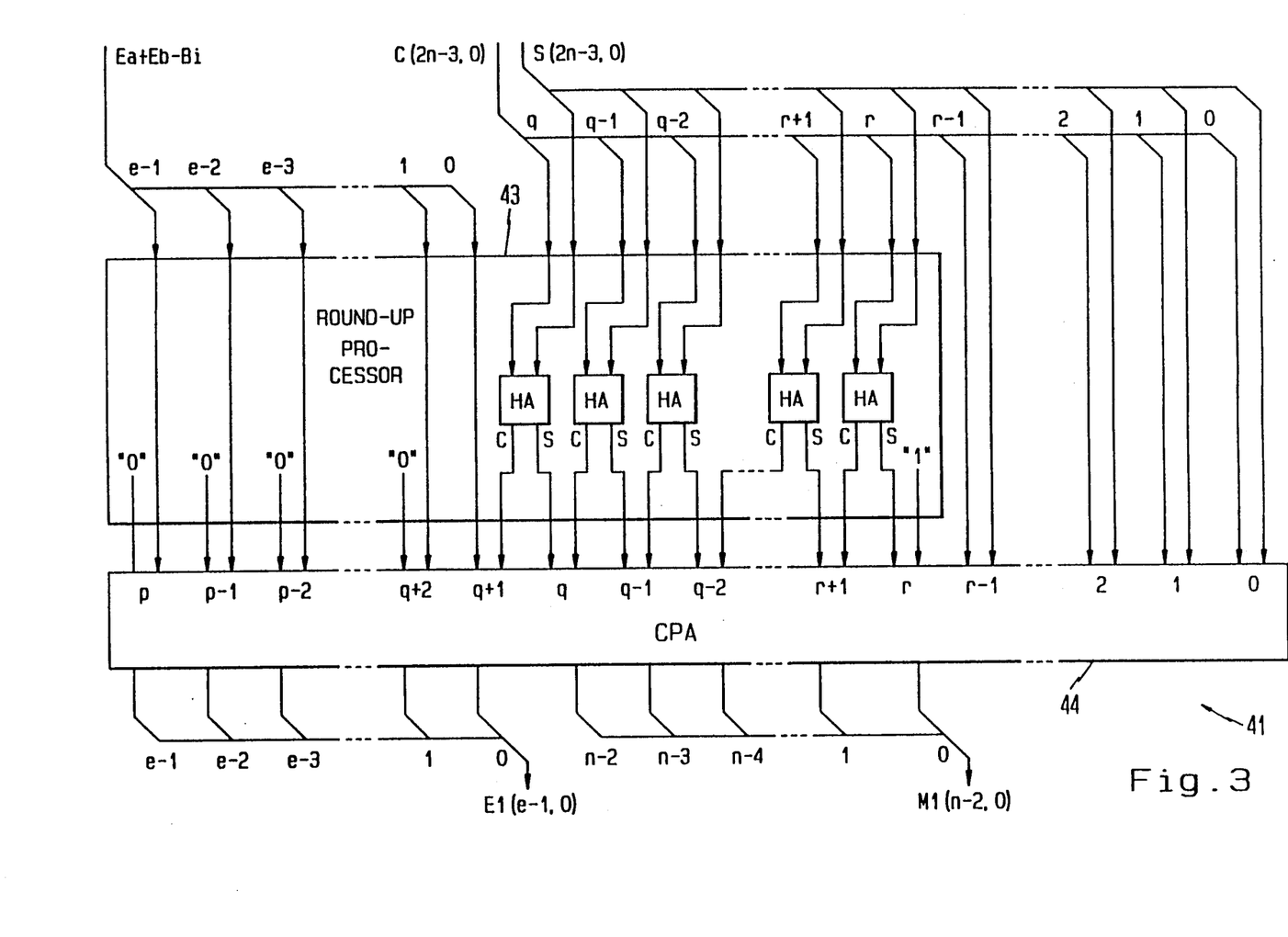
FIG. 3 is a block diagram of a part of the floating-point multiplier device depicted in FIG. 2.

Turning to FIG. 3 during a short while, the first round-up carry propagate adder 41 comprises a round-up processor 43. The $(e+2n-3)$-bit carry propagate adder is indicated at 44. The second round-up carry propagate adder 42 has a similar structure. It is possible to understand that the $(e+2n-2)$-bit carry propagete adder is indicated at 44.

The round-up processor 43 has r-th through q-th processor input terminal pairs, $(q+1)$-th through p-th processor input terminals, and r-th through p-th processor output terminal pairs, where p represents a number which is equal to $(e+2n-3)$, q representing another number which is equal to $(2n-3)$, r representing still another number which is equal to $(n-1)$. The r-th through the $(2n-3)$-th bits of the first carry save sum signal part are supplied to the r-th through the q-th processor input terminal pairs. Zeroth through $(e-1)$-th bits of the compensated sum signal are supplied to the $(q+1)$-th through the p-th processor input terminals.

A local mantissa sum is calculated by half adders (HA) which are equal to $(n-1)$ in number and are connected to the processor input and output terminal pairs in the manner depicted. The first mantissa sum and a binary one bit representative of $2^{-(n-1)}$ are delivered to the r-th through the q-th processor output terminal pairs and to one of the $(q+1)$-th processor output terminal pair, to the other of which the zeroth bit of the compensated sum signal is delivered. Other bits of the compensated sum signal and binary zero bits are delivered to the $(q+2)$-th through the p-th processor output terminal pairs.

The carry propagate adder 44 has zeroth through r-th, $(r+1)$-th through q-th, and $(q+1)$-th through p-th adder input terminal pairs and zeroth through p-th adder output terminals, of which the r-th through the p-th adder output terminals are used. The zeroth through the $(r-1)$-th adder input terminal pairs are supplied with the zeroth through the $(r-1)$-th bits of the first carry save sum signal part. The r-th through the p-th adder input terminal pairs and one of the $(q+1)$-th adder input terminal pair are supplied with the binary one bit and a local mantissa sum signal representative of the local mantissa sum. The other of the $(q+1)$-th adder output terminal pair is supplied with the zeroth bit of the compensated sum signal. The $(q+2)$-th through the p-th adder output terminal pairs are supplied with the first through the $(e-1)$-th bits of the compensated sum signal and the binary zero bits. The $(q+1)$-th through the p-th adder output terminals, e in number, are for producing the first sum exponent signal. The r-th through the q-th adder output terminals, $(n-1)$ in number, are for producing the first rounded signal.

It is now understood that the first round-up carry propagate adder 41 is operable when the mantissa product signal includes the first succession as its integer bits. In other words, the first round-up carry propagate adder 41 is operable when the mantissa product is not less than decimal one and is less than two.

In the round-up processor 43, the compensated sum signal and the first decimal sum signal are concatenated into a first concatenation. At the processor output terminal pairs, the first concatenation is rounded up into a first rounded concatenation by addition thereto of the binary one bit at one of the r-th processor output terminal pair. The first rounded concatenation is supplied to the carry propagate adder 44 and is used in calculating a first calculated concatenation with carry propagated through the first rounded concatenation. At the adder output terminals, the first calculated concatenation is divided into the first sum exponent signal and the first rounded signal which consist of a more significant bits and $(n-1)$ less significant bits of the first calculated concatenation.

As the first rounded mantissa, the first rounded signal represents decimal bits of the rounded-off mantissa Mc, which is equal to the first rounded-down mantissa Ml plus $2^{-(n-1)}$ in accordance with Equation (7). The rounded-off mantissa is the mantissa product which is represented by the mantissa product signal and is rounded up when the first concatenation is rounded up into the first rounded concatenation. If the mantissa product is not less than one and is less than two, a carry of a binary zero bit is propagated to the zeroth bit of the first sum exponent signal. In this event, the first sum exponent signal represents the compensated exponent Ep as the first sum exponent in compliance with Equation (3"). If the mantissa product becomes equal to decimal 2.0, a carry of a binary one bit is propagated to the zeroth bit of the first sum exponent signal. In such an event, the first sum exponent signal represents the compensated exponent plus one according to Equation (4').

As for the second round-up carry propagate adder 42, p represents an integer which is equal to $(e+2n-2)$, q representing another integer which is equal to $(2n-2)$, r representing still another integer which is equal to n. The half adders (HA) are $(n-1)$ in number as above. Supplied with the adjusted sum signal and the second carry and sum parts, the second round-up carry propagate adder 42 is operable when the mantissa product signal includes the second succession as its integer bits, namely, when the mantissa product is not less than two and is less than four.

In the round-up processor 43 of the second round-up carry propagate adder 42, the adjusted sum signal and the second decimal sum signal are concatenated into a second concatenation. At the processor output terminal pairs of this processor 43, the second concatenation is rounded up into a second rounded concatenation by addition thereto of the binary one bit at one of the r-th processor output terminal pair. The second rounded concatenation is delivered to the carry propagate adder 44 of the second roundup carry propagate adder 42 and is used in calculating a second calculated concatenation with carry propagation through the second rounded concatenation. At the adder output terminals of this adder 44, the second calculated concatenation is divided into the second sum exponent signal of e upper bits and the second rounded signal of (n−1) lower bits.

The second rounded signal represents decimal bits of the rounded-off mantissa Mc as the second rounded mantissa. The rounded-off mantissa is equal to the second rounded-down mantissa plus $2^{-(n-1)}$ according to Equation (8) and is the mantissa product which is represented by the mantissa product signal and is rounded up when the second concatenation is rounded up into the second rounded concatenation. If the mantissa product is not less than two and is less than four, a carry of a binary zero bit is propagated to the zeroth bit of the second sum exponent signal. In this case, the second sum exponent signal represents the adjusted exponent Eq in accordance with Equation (5'). If the mantissa product becomes equal to 2.0, a carry of a binary one bit is propagated to the zeroth bit of the second sum exponent signal. In such a case, the second sum exponent signal represents the adjusted exponent plus one in compliance with Equation (6').

Turning back to FIG. 2, the floating-point multiplier device comprises first and second round off decoders 46 and 47. A combination of the decoders 46 and 47 is a counterpart of another combination of the second mantissa selector 32 and the round off decoder 34 described in conjunction with FIG. 1. A different first part M(n, 0) is selected from the mantissa product signal M(2n−1, 0) for supply to the first round off decoder 46. A different second part M(n−1, 0) is selected from the mantissa product signal for supply to the second round off decoder 47.

The first and the second round off decoders 46 and 47 are operable in cooperation according to the logic listed in Table 1 before. More particularly, the first round off decoder 46 is operable when the mantissa product is not less than decimal one and is less than two. The second round off decoder 47 is operable when the mantissa product is not less than two and is less than four. The first round off decoder 46 produces first and second primary decoded signals which indicate that the mantissa product signal should be rounded down and rounded up. The second round off decoder 47 produces first and second secondary decoded signals which indicate that the mantissa product signal should be rounded down and rounded up.

In this manner, a combination of the first and the second round off decoders 46 and 47 serves as a decoding section connected to the mantissa carry propagate adder 27. Decoding selected bits of the mantissa product signal, the decoding section (46–47) produces the first primary and secondary decoded signals collectively as a first decoded signal and the second primary and secondary decoded signals collectively as a second decoded signal.

It is now understood that the decoding section (46–47) is operable in whichever of two manners where the mantissa product is not less than one and is less than two and where the mantissa product is not less than two and is less than four. The first decoded signal indicates that the mantissa product signal should be rounded down, namely, should be used in the first and the third cases. The second decoded signal indicates that the mantissa product signal should be rounded up, namely, should be used in the second and the fourth cases.

A normalization and round-off or round-off and normalization decoder 48 is connected to the mantissa carry propagate adder 27 and the decoding section (46–47). Decoding a combination of the most significant bit M(2n−1) of the mantissa product signal and the first and the second decoded signals, the round-off and normalization decoder 48 produces first through fourth selection signals in compliance with a logic which is listed in Table 2 below.

TABLE 2

| MSB of adder 27 | Output of decoder 46 | Output of decoder 47 | Output of decoder 48 |
|---|---|---|---|
| 0 | down | x | first |
| 0 | up | x | third |
| 1 | x | down | second |
| 1 | x | up | fourth |

In Table 2, it will be noted that one of four columns is labelled "Output of decoder 46". Another column is labelled "Output of decoder 47". In each of these columns, the first decoded signal is indicated by "down" and the second decoded signal, by "up". The symbol x represents whichever of the first and the second decoded signals. In the column labelled "Output of decoder 48", the first through the fourth selections signals are listed with the words "selection signal" omitted.

A selector 49 is connected to the exponent adder (21-23), the mantissa carry propagate adder 27, the first and the second round-up carry propagate adders 41 and 42, and the round-off and normalization decoder 48. It will be noted that four line-segments are horizontally drawn in the block 49. These line segments will be called first through fourth lines as counted from the bottom to the top upwardly of the figure. The first line represents a first part of the selector 49. The first part is controlled by the first selection signal. The second line represents a second part controlled by the second selection signal. The third line represents a third part controlled by the third selection signal and the fourth line, a fourth part controlled by the fourth selection signal.

As a primary decimal part with round down of the mantissa product signal M(2n−1, 0), the first primary part M(2n−3, n−1) is supplied to the first part together with the compensated sum signal. When activated by the first selection signal, the first part selects the compensated sum Ep as the ultimate exponent Ec and the primary decimal part as the modified mantissa Mc'. It is now understood that the first selection signal indicates round down and no normalication bit shift.

As a secondary decimal part with round down, the second primary part M(2n−2, n) is delivered to the second part together with the adjusted sum signal. It should be noted that the adjusted sum signal is for use when the mantissa product is not less than two. The secondary decimal part is therefore subjected to the one-bit normalization shift. When energized by the second selection signal, the second part selects the adjusted sum Eq as the ultimate exponent Ec and the secondary decimal part as the modified mantissa with the one-bit normalization shift. In this manner, the second selection signal indicates round down and the one-bit normalization shift.

The first sum exponent signal E1(e−1, 0) and the first rounded signal M1(n-2, 0) are supplied to the third part.

When put into operation by the third selection signal, the third parts selects the first sum exponent as the ultimate exponent Ec and the first rounded mantissa as the modified mantissa Mc'. It is now appreciated that the third selection signal indicates round up and no normalization bit shift.

The second sum exponent signal $E2(e-1, 0)$ and the second rounded signal $M2(n-2, 0)$ are supplied to the fourth part. Being opt into operation by the fourth selection signal; the fourth part selects the second sum exponent as the ultimate exponent Ec and the second rounded mantissa as the modified mantissa Mc'. It is therefore clear that the fourth selection signal indicates round up and the one-bit normalization shift.

Reviewing FIGS. 2 and 3, it will be noted that the first round-up carry propagate adder 41 is supplied with the first decimal part $C(2n-3, 0)$ and $S(2n-3, 0)$ as a first whole sum signal. The second round-up carry propagate adder 42 is supplied with the second decimal part $C(2n-2, 0)$ and $S(2n-2, 0)$ as a secoond whole sum signal. In each of the first and the second round-up carry propagate adders 41 and 42, the zeroth through the $(n-1)$-th bits of such a decimal part are supplied directly to the carry propagate adder 44.

At any rate, the illustrated floating-point multiplier device is operable in an unexpectedly short calculation time. When attention is directed to a critical path, the calculation time is as follows in nanoseconds.

| | |
|---|---|
| Multiplier array 26 | 40 |
| CPA 27 (a 106-bit CPA) | 30 |
| Decoding section (46–47) | 5 |
| Decoder 48 | 5 |
| Selector 49 | 5 |
| Total | 85. |

For another critical path, the calculation time in nanoseconds is as follows.

| | |
|---|---|
| Multiplier array 26 | 40 |
| Round-up processor 43 | 5 |
| CPA 44 (a 115-bit CPA) | 35 |
| Selector 49 | 5 |
| Total | 85. |

It should, however, be noted that the illustrated floating-point multiplier device comprises three carry propagate adders 27, 41, and 42, which must deal with 338 bits in total when applied to the double precision data specified by the IEEE Standard 754. In contrast, the conventional floating-point multiplier device comprises only two carry propagate adders 27 and 35 which are for dealing with 169 bits in total. It may consequently appear at a first glance that the illustrated floating-point multiplier device requires an appreciably increased amount of hardware. The fact is, however, that the multiplier array 26 requires a considerable part of a total amount of hardware. As a result, only a slightly increased amount of hardware is necessary in the floating-point multiplier device being illustrated. Incidentally, another carry propagate adder 21 is used both in the example being illustrated and in the conventional floating-point multiplier device to deal with only a small number of bits.

Figure 4:
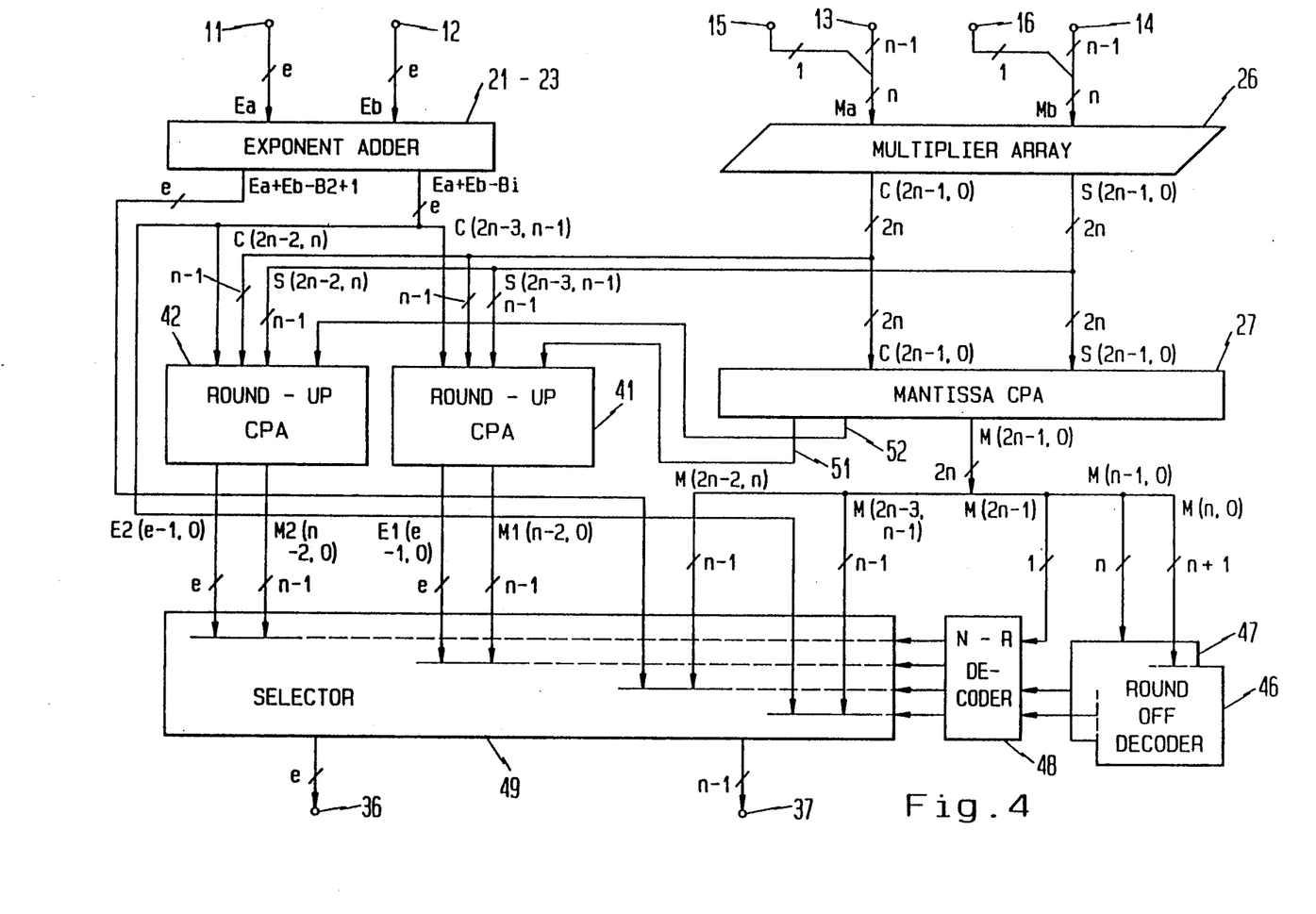
FIG. 4 is a block diagram of a floating-point multiplier device according to a second embodiment of this invention.

Referring now to FIG. 4, attention will be directed to a floating-point multiplier device according to a second embodiment of this invention. Similar parts are designated by like reference numerals and are similarly operable with likewise named signals. In the manner which will presently be described, the first and the second round-up carry propagate adders are a little different from those illustrated wtih reference to FIG. 3. These adders are nevertheless designated by the reference numerals 41 and 42 merely for convenience of designation. It should be additionally noted that the mantissa carry propagate adder 27 is very slightly different from that described in conjunction with FIG. 2, More particularly, the compensated sum signal is delivered to both the first and the second round-up carry propagate adders 41 and 42. The first round-up carry propagate adder 41 is supplied with only a first upper sum signal $(2n-3, n-1)$ and $S(2n-3, n-1)$ of the first decimal sum signal. The second round-up carry propagate adder 42 is supplied with only a second upper sum signal $C(2n-2, n)$ and $S(2n-2, n)$ of the second decimal sum signal. It is, however, possible to understand that the round off is carried out on the first and the second concatenations. More in general, such a signal is rounded up by counting a first fraction as one at a first predetermined place, such as the $(n-1)$-th bit, and by counting a second fraction as one at a second predetermined place, such as the n-th bit, where the first and the second fractions are fractions which follow immediately to the right of the first and the second predetermined places.

In a carry propagate adder, such as the mantissa carry propagate adder 27, a carry signal of either binary zero or binary one is propagated to a predetermined bit from a lower bit which immediately follow to the right of the predetermined bit. In the example being illustrated, a first carry signal is delivered from the mantissa carry propagate adder 27 to the first round-up carry propagate adder 41 through a first connection 51 while propagated from the $(n-2)$-th bit to the $(n-1)$-th bit. A second carry signal is delivered to the second round-up carry propagate adder 42 through a second connection 52 while propagated in the mantissa carry propagate adder 27 from the $(n-1)$-th bit to the n-th bit.

Figure 5:
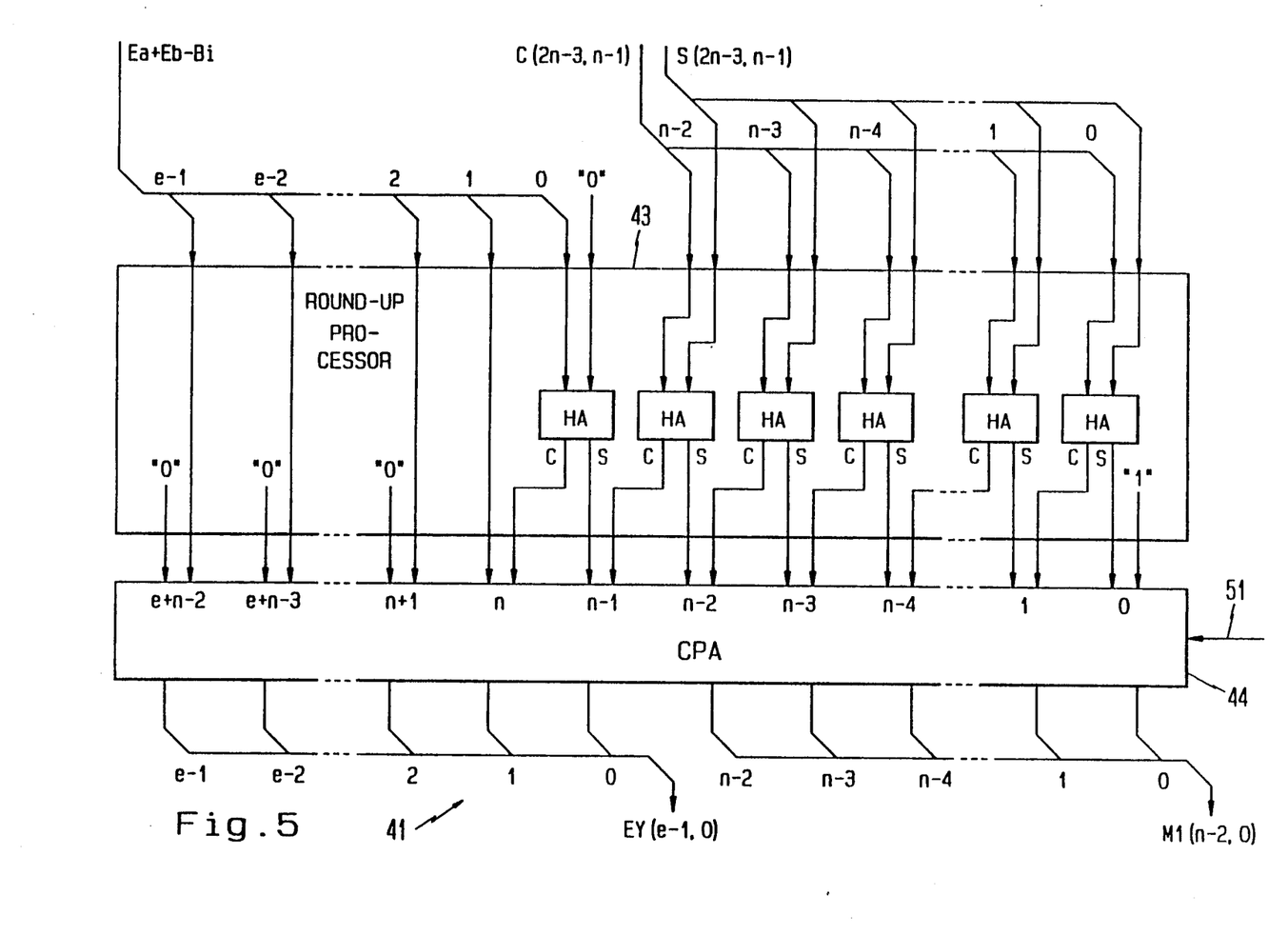
FIG. 5 is a block diagram of a part of the floating-point multiplier device illustrated in FIG. 4.

Turning temporarily to FIG. 5, the first round-up carry propagate adder 41 comprises a round-up processor and an $(e+n-1)$-bit carry propagate adder which are again designated by the reference numerals 43 and 44. The round-up processor 43 has zeroth through $(n-1)$-th processor input terminal pairs, n-th through $(e+n-2)$-th processor input terminals, and zeroth through $(e+n-2)$-th processor output terminal pairs. The carry propagate adder 44 is supplied with the first carry signal and has zeroth through $(e+n-2)$-th adder input terminal pairs and zeroth through $(e+n-2)$-th adder output terminals.

The round-up processor 43 comprises half adders (HA) between the zeroth thorugh the $(n-1)$-th processor input terminal pairs and one of the zeroth processor output terminal pair, the first through the $(n-1)$-th processor output terminal pairs, and one of the n-th processor output terminal pair. The compensated sum signal is supplied to the $(e+n-2)$-th through the n-th processor input terminals and one of the $(n-1)$-th processor input terminal pair. The first upper sum signal is supplied to the zeroth through the $(n-2)$-th processor input terminal pairs. The other of the $(n-1)$-th processor input terminal pair is supplied with a binary zero bit. This is because the round-up processor 43 deals with the compensated sum signal without modification as it stands.

The other of the n-th processor output terminal pair is supplied with the first bit of the compensated sum signal. The zeroth bit of the compensated sum signal is delivered to one of the $(n-1)$-th processor output terminal pair, to the other of which a carry from the $(2n-3)$-th bit of the first upper sum signal is propagated from one of the half adders. The round-up processor 43 therefore concatenates the first upper sum signal in effect to the compensated sum signal to provide the first concatenation. The other of the zeroth processor output terminal pair is supplied with a binary one bit for round up of the first concatenation to the first rounded concatenation.

Supplied with the first carry signal through the first connection 51, the carry propagate adder 44 calculates the first calculated concatenation. Like the carry propagate adder described in connection with FIG. 3, the illustrated carry propagate adder 44 produces e upper bits and $(n-1)$ lower bits of the first calculated concatenation as the first sum exponent signal $E1(e-1, 0)$ and the first rounded signal $M1(n-2, 0)$.

The second round-up carry propagate adder 42 is only alightly different from the first round-up carry propagate adder illustrated with reference to FIG. 3 and will therefore be described with reference to FIG. 5. In the second round-up carry propagate adder 42, each of a round-up processor 43 and an $(e+n-1)$-bit carry propagate adder 44 has a similar structure. The carry propagate adder 44 is, however, supplied with the second carry signal through the second connection 52. In order to produce the adjusted sum signal from the compensated sum signal supplied to the round-up processor 43, a binary one bit is supplied together with the zeroth bit of the compensated sum signal to the $(n-1)$-th processor input terminal pair. It is now understood that the carry propagate adder 44 produces e more significant bits and $(n-1)$ less significant bits of the second calculated concatenation as the second sum exponent signal $E2(e-1, 0)$ and the second rounded signal $M2(n-2, 0)$.

Turning back to FIG. 4, other parts of the illustrated floating-point multiplier device are not different from corresponding parts of the floating-point multiplier device illustrated with reference to FIG. 2. The calculation time is substantially similar to that described by reviewing FIGS. 2 and 3. The amount of hardware is astonishingly reduced by $(2n-1)$ bits in total as compared with the floating-point multiplier device illustrated with reference to FIGS. 2 and 3. More specifically, the carry propagate adders 27, 41, and 42 deal with 233 bits in total. Taking the amount of hardware of the multiplier array 26 into account, the illustrated floating-point multiplier device requires only from 1.1 to 1.2 times as much an amount of hardware when compared with the conventional floating-point multiplier device.

Reviewing FIGS. 2 through 4, it should clearly be understood that the illustrated floating-point multiplier devices are operable in each of the first through the fourth cases. This makes it possible to put a floating-point multiplier device in operation with an excellently short operation time and with only a slightly increased amount of hardware. Above all, the mantissa carry propagate adder 27 and the first and the second round-up carry propagate adders 41 and 42 are supplied with the mantissa carry signal $C(2n-1, 0)$ and the mantissa sum signal $S(2n-1, 0)$ from the multiplier array 26. These three carry propagate adders 27, 41, and 42 are therefore operable in parallel, namely, simultaneously or concurrently, in marked contrast to the mantissa carry propagate adder 27 and the ultimate carry propagate adder 35 of the prior art, among which the mantissa carry propagate adder 27 must carry through the carry propagate addition prior to the ultimate carry propagate adder 35.

If it is desired to calculate a product of three or more numbers, it is possible to repeatedly use the floating-point multiplier device being illustrated. In this event, it is desirable to round off the mantissa product signal and the first and the second concatenations with attention directed to accumulation of round-off errors.

When the mantissa product signal is the first product signal, a first part may be selected from the mantissa product signal $M(2n-1, 0)$ with the binary zero and the binary one bits of the first succession omitted. A second part may be selected from the mantissa product signal with the binary one bit alone omitted from the second succession in the mantissa product signal. When composed of $(2n-2)$ bits, the first part is represented by $M(2n-3, 0)$. Similarly, the second part may be represented by $M(2n-2, 0)$. Alternatively, the first and the second parts may be the first and the second primary parts. It is possible to conveniently use such expressions on describing this invention. When the first and the second carry signals are derived from the mantissa carry propagate adder 27, it is possible to make the round-off decoding section (46-47) decode a combination of the first and the second carry signals on producing the first or the second decoded signal.

It should furthermore be understood in connection with FIGS. 3 and 5 that most of the half adders (HA) are supplied with common bits of the mantissa carry signal and of the mantissa sum signal in the first and the second round-up carry propagate adders 41 and 42. It is therefore possible to implement these half adders by common hardware for use in the first and the second round-up carry propagate adders 41 and 42. Above all, it is possible to make each pair of corresponding half adders share a common input gate.

While this invention has thus far been described in specific conjunction with only two preferred embodiments thereof, it will now be readily possible for one skilled in the art to put this invention into effect in various other manners. For example, each carry propagate adder may be changed to one of various known equivalents thereof, such as a carry look-ahead adder or a carry select adder. If the carry select adder is substituted for any one of the carry propagate adders, about twice as much an amount of hardware is necessary. It is, however, possible in such an event to suppress this increase in the amount of hardware by using a common adder in each pair of corresponding adders used in the first and the second carry propagate adders 41 and 42, which are now first and second round-up carry select adders.

What is claimed is:

1. A floating-point multipler device supplied with binary data signals which represent a first number comprising a first exponent and a first mantissa and a second number comprising a second exponent and a second mantissa and comprises first and second exponent signals representative of said first and said second exponents and first and second mantissa signals representative of said first and said second mantissas, said floating-point multiplier device being for calculating an ultimate product of said first and said second numbers, said ultimate product comprising an ultimate exponent and a rounded-off mantissa, said floating-point multiplier device comprising:

an exponent adder supplied with said first and said second exponent signals to produce an exponent sum signal representative of an exponent sum of said first and said second exponents;

a multiplier array supplied with said first and said second mantissa signals to produce a carry save sum signal representative of a carry save sum as a provisional product of said first and said second mantissas;

a mantissa carry propagate adder connected to said multiplier array to use said carry save sum signal in producing a mantissa product signal representative of a mantissa product of said first and said second mantissa with said provisional product used in calculating said mantissa product;

a first round-up carry propagate adder connected to said exponent adder and said multipler array to use said exponent sum signal and said carry save sum signal in producing a first sum exponent signal representative of a first sum exponent and a first rounded signal representative of a first rounded mantissa;

a second round-up carry propagate adder connected to said exponent adder and said multipler array to use said exponent sum signal and said carry save sum signal in producing a second sum exponent signal representative of a second sum exponent and a second rounded signal representative of a second rounded mantissa; and selecting means connected to said exponent adder, said mantissa carry propagate adder, and said first and said second rounded-up carry propagate adders for selecting said ultimate exponent from said exponent sum and said first and said second sum exponents and said rounded-off mantissa from said mantissa, product and said first and said second rounded mantissas.

2. A floating-point multipler device as claimed in claim 1, wherein said mantissa carry propagate adder and said first and said rounded-up carry propagate adders are operable in parallel.

3. A floating-point multipler device as claimed in claim 2, each of said first and said second mantissa signals including a binary one bit as its integer bit, wherein:

said first rounded-up carry propagate adder is operable when said mantissa product signal includes a succession of a binary zero bit and a binary one bit as its integer bits and is for concatenating said exponent sum signal and a first decimal sum signal into a first concatenation, rounding up said first concatenation into a first rounded concatenation, using said first rounded concatenation in calculating a first calculated concatenation with carry propagate through said first rounded cancatenation, and dividing said first calculated concatenation into said first sum exponent signal and said first rounded signal, said first decimal sum signal being obtained from said carry save sum signal by omitting its most significant bit and a next significant bit which immediately follows said most significant bit;

said second rounded-up carry propagate adder being operable when said mantissa product signal includes a succession of a binary one and a binary zero bits as its integer bits and being for concatenating said exponent sum signal and a second decimal sum signal into a second concatenation, rounding up said second concatenation into a second rounded concatenation, using said second rounded concatenation in calculating a second calculated concatenation with carry propagation through said second rounded concatenation, dividing said second calculated concatenation into said second sum exponent signal and said second rounded signal, said second decimal sum signal being obtained from said carry save sum signal by omitting its most significant bit.

4. A floating-point multipler device as claimed in claim 3, said mantissa product signal including a most and a least significant bit, wherein said selecting means comprises:

round off decoding means connected to said mantissa carry propagate adder for decoding said mantissa product signal into a first decoded signal indicative of round down and a second decoded signal indicative of round up;

a round-off and normalization decoder connected to said mantissa carry propagate adder and said round off decoding means for decoding a combination of said most significant bit and said first and said second decoded signals into a first selection signal indicative of round down and no normalication bit shift. A second selection signal indicative of round down and a one-bit normalization shift of said mantissa product signal towards said least significant bit, a third selection signal indicative of round up and no normalization bit shift, and a fourth selection signal indicative of round up and said one-bit normalization shift; and a selector connected to said exponent adder, said mantissa carry propagate adder, said first and said second round-up carry propagate adders, and said round-off and normalization decoder for selecting as said ultimate exponent and said rounded-off mantissa said exponent sum and the mantissa product with round down and with no normalization bit shift, said exponent sum and the mantissa product with round down and with said one-bit normalization shift, said first sum exponent and said first rounded matissa, and said second sum exponent and said second rounded matissa when said round-off and normalization decoder produces said first, said second, said third, and said fourth selection signals respectively.

5. A floating-point multipler device as claimed in claim 4, said most significant bit being one of a binary zero and a binary one bit at a time, wherein said round-off and normalization decoder is for producing;

said first selection signal when said most significant bit is said binary zero bit and furthermore when said round off decoding means produces said first decoded signal;

said second selection signal when said most significant bit is said binary one bit and furthermore when said round off decoding means produces said afirst decoded signal;

said third selection signal when said most significant bit is said binary zero bit and furthermore when said round off decoding means produces said second decoded signal; and said fourth selection signal when said most significant bit is said binary one bit and furthermore when said round off decoding means produces said second decoded signal.

6. A floating-point multiplier device as claimed in claim 3, wherein:
   said first round-up carry propagate adder is supplied with a first whole sum signal which is said first decimal sum signal used as a whole;
   said second round-up carry propagate adder being supplied with a second whole sum signal which is said second decimal sum signal used as a whole.

7. A floating-point multiplier device as claimed in claim 6, said mantissa product signal including a most and a least significant bit and becoming one of first and second product signals at at time, said first product signal including a first succession of a binary zero and a binary one bit as its integer bits, said mantissa product signal comprising first and second parts, said first part being obtained from said mantissa product signal by omitting the binary zero and the binary one bits from said first succession, said second part being obtained from said mantissa product signal by omitting the binary one bit alone from said second succession, wherein said selecting means comprises:
   round off decoding means connected to said mantissa carry propagate adder for decoding a combination of said first and said second parts into a first decoded signal indicative of round down and a second decoded signal indicative of round up;
   a round-off and normalization decoder connected to said mantissa carry propagate adder and said round off decoding means for decoding a combination of said most significant bit and said first and said second decoded signals into a first selection signal indicative of round down and no normalization bit shift of said first part, a second selection signal indicative of round down and a one-bit normalization shift of said second part towards said least significant bit, a third selection signal indicative of round up and said no normalization bit shift, and a fourth selection signal indicative of round up and said one-bit normalization shift; and
   a selector connected to said exponents adder, said mantissa carry propagate adder, said first and said second round-up carry propagate adders, and said round-off and normalization decoder for selecting as said ultimate exponent and said round-off mantissa said exponent sum and the first part with round down and with said no normalization bit shift, said exponent sum and the second part with round down and with said one-bit normalization shift, said first sum exponent and said first rounded mantissa, and second sum exponent and said second rounded mantissa when said round-off and normalization decoder produces said first, said second, said third, and said fourth selection signals, respectively.

8. A floating-point multiplier device as claimed in claim 3, said first concatenation being rounded up into said first rounded concatenation by counting a first fraction as one at a first predetermined place, said second concatenation being rounded up into said second rounded concatenation by counting a second fraction as one at a second predetermined place, wherein:
   said mantissa carry propagate adder is for producing said mantissa product signal together with a first carry signal representative of a carry from said first fraction to said first predetermined place and a second carry signal representative of a carry from said second fraction to said second predetermined place;
   said first round-up carry propagate adder being additionally connected to said mantissa carry propagate adder and supplied with a first upper sum signal and said first carry signal collectively as said first decimal sum signal, said first upper sum signal being obtained from said first decimal sum signal by omitting said first fraction;
   said second round-up carry propagate adder being additionally connected to said mantissa carry propagate adder and supplied with a second upper sum signal and said second carry signal collectively as said second decimal sum signal, said second upper sum signal being obtained from said second decimal sum signal by omitting said second fraction.

9. A floating-point multiplier device as claimed in claim 8, said mantissa product signal including a most and a least significant bit and becoming one of first and second product signals at at time, said first product signal including a first succession of a binary zero and a binary one bit as its integer bits, said second product signal including a second succession of a binary one and a binary zero bit as its integer bits, wherein said selecting means comprises:
   round-off decoding means connected to said mantissa carry propagate adder for decoding a combination of said first and said second carry signals into a first decoded signal indicative of round down and a second decoded signal indicative of round up;
   a round-off and normalization decoder connected to said mantissa carry propagate adder and said round-off decoding means for decoding a combination of said most significant bit and said first and said second decoded signals into a first selection signal indicative of round down and no normalization bit shift of said mantissa product signal, a second selection signal indicative of round down and a one-bit normalization of said mantissa product signal towards said least significant bit, a third selection signal indicative of round up and said no normalization bit shift, and a fourth selection signal indicative of round up and said one-bit normalization shift; and
   a selector connected to said exponent adder, said mantissa carry propagate adder, said first and said second round-up carry propagate adders, and said round-off and normalization decoder for selecting as said ultimate exponent and said rounded-off mantissa said exponent sum and the first part with round down and with said no normalization bit shift, said exponent sum and the second part with round down and with said one-bit normalization shift, said first sum exponent and said second rounded mantissa, and said second sum exponent and said second rounded mantissa when said round-off and normalization decoder produces said first, said second, said third, and said fourth selection signals, respectively.

* * * * *